3,160,640
METHOD OF EXTRACTING GRISEOFULVIN FROM MYCELIUM AND NATIVE SOLUTION

Valter Osvaldovich Coolbach, Valentina Iakovlevna Raygorodskaia, and Galina Vasilievna Efimova, all of Leningrad, U.S.S.R., assignors to Leningradsky Nauchno-Issledovatelsky Institute Antibiotikov
No Drawing. Filed Sept. 29, 1961, Ser. No. 143,014
7 Claims. (Cl. 260—346.2)

The present invention relates to a method of extracting griseofulvin from mycelium and native solution.

It is known that such inflammable and dangerously explosive extractants as butyl acetone, dioxan, amyl acetone, dimethyl formamide, diethyl ether as well as such noxious extractants as trichloroethylene and chloroform are employed for extracting griseofulvin from mycelium and native solution.

They are not only inflammable and toxic, but also involve a number of shortcomings such as non-selectivity of griseofulvin, high cost of production and a high boiling point/more than 50° C.

Extractants with boiling points above 50° C. are employed because of the necessity of utilizing for the extraction of raw griseofulvin vacuum distillation of the extractant in order to prevent heating and inactivating the raw griseofulvin. This leads to additional expenditures.

The method of extracting griseofulvin as described in the present invention consists in extracting griseofulvin from mycelium and native solution with the aid of methylene-chloride, since it does not possess the aforesaid shortcomings of these above-noted extractants.

After the extract is obtained and filtered, it is vaporized and crystallized at a temperature of −8°C. The raw antibiotic is then diluted in acetone and re-crystallized.

Griseofulvin by means of methylene chloride is extracted from frozen mycelium, and then the raw griseofulvin with its acetone solution is clarified through acidic dry charcoal.

The purpose of the present invention is to create a method of extracting griseofulvin by means of a non-inflammable, explosive-proof and non-toxic extractant.

The second purpose of the invention is to utilize a low-boiling extractant for extracting griseofulvin, thereby avoiding the necessity of utilizing vacuum conditions.

The primary object of the invention is to utilize an extractant for extracting griseofulvin possessing a selectivity with regards to griseofulvin.

Another object of the invention is to increase the output and to obtain clean griseofulvin.

Still another object of the invention is to reduce the equipment needed for the realization of the method and to decrease the cost of production.

A further object and advantage of the present invention will be seen from the description given herein, as well as from the examples set forth to illustrate the realization of the invention.

The method of extracting griseofulvin from mycleium and native solution is realized according to the following scheme:

The mycelium separated from the native solution on a filter and preliminarily frozen in a cooler at −10° C. during 48 hours, is extracted three times by means of technical methylene chloride taken in a volume of 2:1:1 with relation to the weight of mycelium, and intensively mixed in a homogenizer for half an hour.

The latter is furnished with a double high speed four-blade mixer with cutting knives of the type of a tissue grinder. The extract after cooling is poured through a lower drain, separating it from the mycelium rising to the surface, and after the third extraction it is pressed on a filter, then the extractant retained by the mycelium, is sucked over with a vacuum.

The assembled extracts are vapourized to $1/10$ part of the initial volume in a vaporizer which is heated to a temperature of not more than 50° C. by hot water.

0.5% of dry clarifying acidic charcoal containing not more than 0.05% of iron is mixed into a heated orange-yellow concentrate of raw griseofulvin, then blended 20 minutes and sampled to determine the bleaching. The waste charcoal is filtered on a heated filter and flushed with methylene chloride warmed to 35 or 36° C., to an amount equal to 2.5% of the filtrate volume, adding the flushed liquid to the main filtrate.

The clairfied concentrate is kept cool at −10° C. during 12 hours, after which brownish flake-like admixture falling in small quantities, are separated on the filter.

The filtrate is vaporized at a temperature not exceeding 50° C. in a vaporizer, heated by water until the raw griseofulvin begins crystallizing, i.e., approximately to $1/15$ part of the initial volume of the liquid extract.

The vaporized extract is crystallized in a crystallizer at a temperature of −8° C. The fall-out crystals of raw griseofulvin are separated from the mother liquor by a centrifuge.

Then the raw griseofulvin is flushed with acetone on a filter at −5° C. to a quantity equal to 10% of the filtrate volume; the flushed liquid is collected separately. 88% pure griseofulvin is produced, according to spectrophotometric analysis, having a melting point of 210 or 211° C. and an output of 95% of the content in mycelium.

The medical preparation is produced from raw griseofulvin by means of diluting it in acetone in the proportion of 1 litre per 40 grams of the raw griseofulvin.

The dilution is accomplished by adding 0.5% of heated dry clarifying acidic charcoal in an apparatus installed with an anchor mixer and a return cooler, and then blended for 15 minutes. The mixture is pressed with compressed nitrogen in a heated filter in order to separate the flake-like admixtures that are insoluble in acetone.

Further purification is carried out by crystallizing the griseofulvin from the acetone solution at a temperature of −8° C. The fall-out griseofulvin crystals are separated by a centrifuge and dried in a vacuum dryer at a temperature of 25° C. and a pressure of 15 mm. of the mercury column in order to separate the acetone and then dried in an air dryer at a temperature of 70° C.

The output of griseofulvin comprises 92.5% as against the theoretical calculation of the raw material or 87.5% of the content in mycelium, the melting point being 219–221° C., and more than 99.5% pure according to spectrophotometric analysis.

*Example 1.*—300 litres of a medium produces 21.3 kilograms of mycelium with an activity of 4.8γ/mg. of mycelium. The mycelium preliminarily cooled at a temperature of −10° C. was extracted by methylene chloride in a series of 42.6, 21.3 and 21.3 litres. After its distillation, clarification and crystallization, 107 gr. of raw griseofulvin, 88% pure were produced. Crystallization of 2.68 litres of acetone produced 89.51 gr. of griseofulvin with a melting point of 219–221° C., containing 99.5% of the basic substance and a humidity of 0.34%, according to spectrophotometric analysis. The output of griseofulvin as against the threoretical calculation comprises 87.5% of the content in mycelium.

*Example 2.*—300 litres of a medium produces 22 kilograms of mycelium with an activity of 6γ/mg. of mycelium. The mycelium preliminarily cooled at a temperature of −10° C. was extracted by methylene chloride in a series of 44, 22 and 22 litres. After its distillation, clarification and crystallization, 122.5 gr. of raw griseofulvin, 87.73 pure, were produced. Crystallization of 3.07 litres of acetone produced 101.9 gr. of griseofulvin with a melting point of 219–221° C., containing 99.6% of the basic substance and a humidity of 0.16%, according to spectrophotometric analysis. The output of griseofulvin as against the theoretical calculation comprises 76.5% of the content in mycelium.

What we claim is:

1. A method of extracting griseofulvin from mycelium and native solution which comprises extracting the griseofulvin with methylene chloride, concentrating the solution thereby obtained, and isolating substantially pure griseofulvin therefrom.

2. A method of extracting griseofulvin from mycelium and native solution which comprises extracting the griseofulvin with methylene chloride, filtering the extract solution, vaporizing the extract solution and then crystallizing the extract.

3. A method of extracting griseofulvin from mycelium and native solution which comprises extracting the griseofulvin with methylene chloride, filtering the extract solution, vaporizing the extract solution to approximately one-fifth the original volume, and then crystallizing the extract at −8° C.

4. A method of extracting griseofulvin from mycelium and native solution which comprises extracting the griseofulvin with methylene chloride, filtering the extract solution, vaporizing the extract solution, and then crystallizing the extract at −8° C. and recrystallizing the extract in acetone.

5. A method of extracting griseofulvin from frozen mycelium and native solution which comprises extracting the griseofulvin with methylene chloride, filtering the extract solution, vaporizing the extract solution, and then crystallizing the extract at −8° C.

6. A method of extracting griseofulvin from mycelium and native solution which comprises extracting the griseofulvin with methylene chloride, filtering the extract solution, vaporizing the extract solution, and freezing the extract solution in order to separate the components thereof.

7. A method of extracting griseofulvin from mycelium and native solution which comprises extracting the griseofulvin with methylene chloride, filtering the extract solution, vaporizing the extract solution, clarifying the concentrated extract with acidic dry charcoal, freezing the extract concentrate in order to separate the extract from the extract concentrate, diluting said extract with acetone, re-clarifying said griseofulvin and acetone solution with acidic charcoal and re-crystallizing said griseofulvin therefrom.

References Cited in the file of this patent

FOREIGN PATENTS 784,618    Great Britain _____ Oct. 9, 1957

OTHER REFERENCES

Jordan: Technology of Solvents (1937), pages 12–13 and 214–5.

Oxford et al.: Biochemical J., vol. 33 (1939), pages 243–4.